ZERO SUPPRESSION CIRCUIT

Filed March 8, 1966 5 Sheets-Sheet 1

INVENTORS.
HOWARD. Z. BOGERT
ALAN E. POUND
GEORGE E. AVERY
BY Jack M. Wiseman
ATTORNEY

ZERO SUPPRESSION CIRCUIT

Filed March 8, 1966 5 Sheets-Sheet 2

FIG. 1-a

INVENTORS.
HOWARD Z. BOGERT
ALAN E. POUND
GEORGE E. AVERY
BY Jack M. Wiseman
ATTORNEY

ZERO SUPPRESSION CIRCUIT

Filed March 8, 1966 5 Sheets-Sheet 3

INVENTORS.
HOWARD Z. BOGERT
ALAN E. POUND
GEORGE E. AVERY
BY Jack M. Wiseman
ATTORNEY June 11, 1968 H. Z. BOGERT ETAL 3,388,384
ZERO SUPPRESSION CIRCUIT
Filed March 8, 1966 5 Sheets-Sheet 4
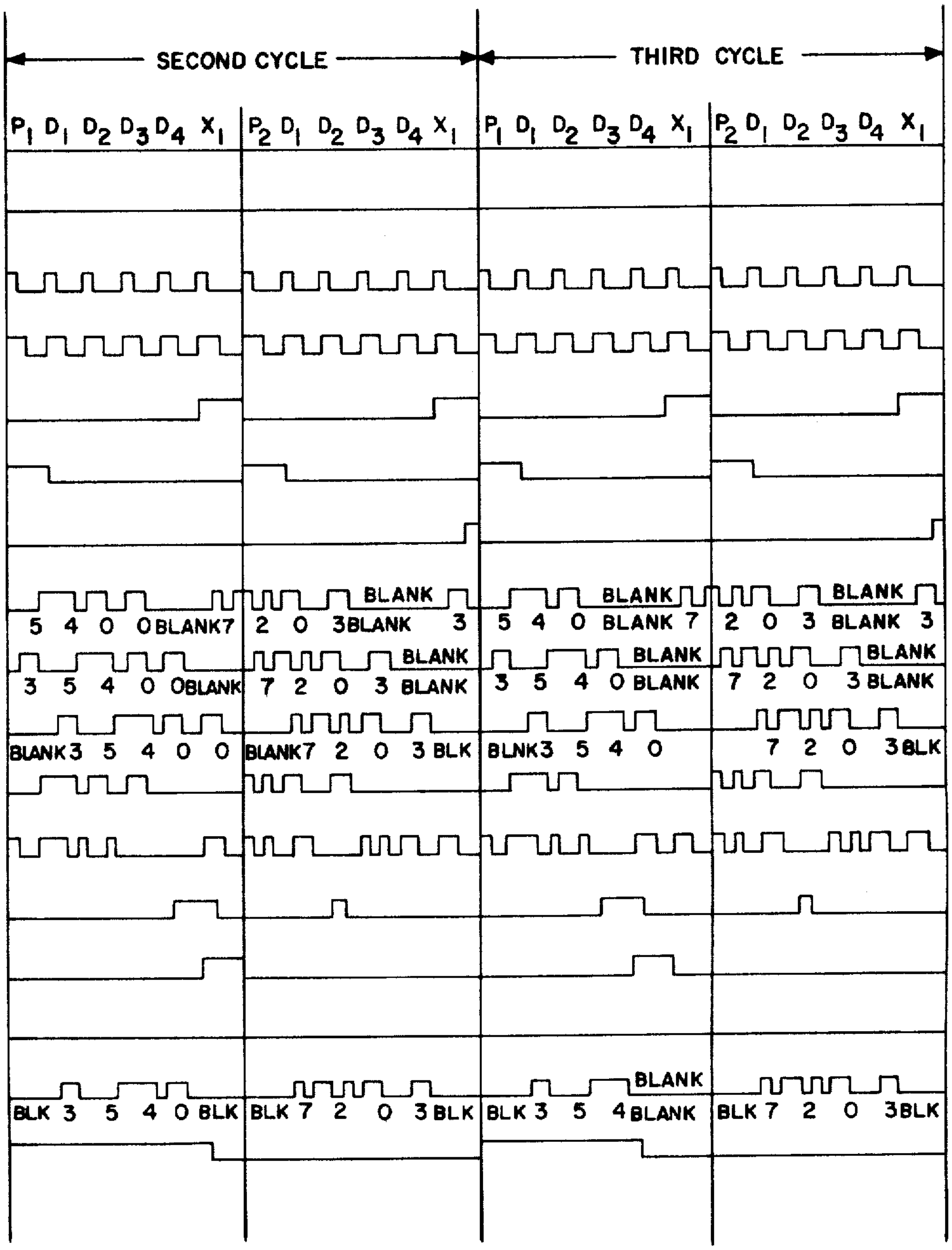
FIG. 2-a
*INVENTORS.*
HOWARD Z. BOGERT
ALAN E. POUND
GEORGE E. AVERY
BY Jack M. Wiseman
ATTORNEY

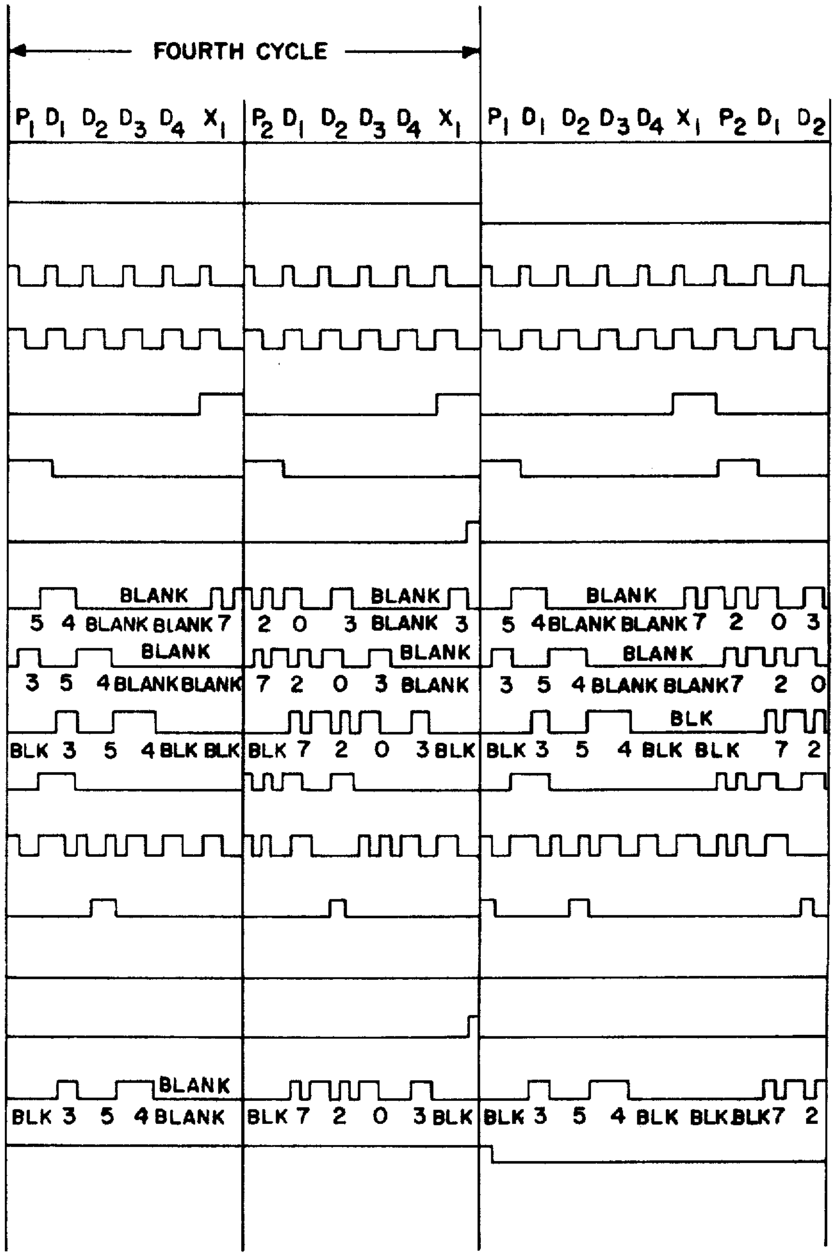
FIG. 2-b
INVENTORS.
HOWARD Z. BOGERT
ALAN E. POUND
GEORGE E. AVERY
BY Jack M. Warner
ATTORNEY

United States Patent Office 3,388,384
Patented June 11, 1968

3,388,384

ZERO SUPPRESSION CIRCUIT

Howard Z. Bogert, Cupertino, Alan E. Pound, Sunnyvale, and George E. Avery, Saratoga, Calif., assignors to General Micro-Electronics Inc., Santa Clara, Calif., a corporation of Delaware Filed Mar. 8, 1966, Ser. No. 532,659
15 Claims. (Cl. 340—172.5)

The present invention relates in general to electronic calculators, and more particularly to a zero suppression circuit for an electronic calculator.

Heretofore, electronic calculators displayed a predetermined number of digits in scanning a horizontal display line regardless of whether all of the digits, such as the zero digits to the left of the most significant non-zero digit of an integer, were significant in the displayed number.

An object of the present invention is to provide a zero suppression circuit for an electronic calculator, whereby insignificant ciphers to the left of the most significant non-zero digit are not displayed in an integer produced by the electronic calculator.

Another object of the present invention is to provide a zero suppression circuit for an electronic calculator that blanks out serially unwanted zeros in the data stream.

Another object of the present invention is to provide a circuit for examining a serial data word, or a series of data words, containing numerical data with insignificant zeros in the words and for removing all zeros in the word or words that are insignificant by inserting a blanking code or signal in their place to prevent their display on a cathode ray tube or other indicating device.

Figure 1:
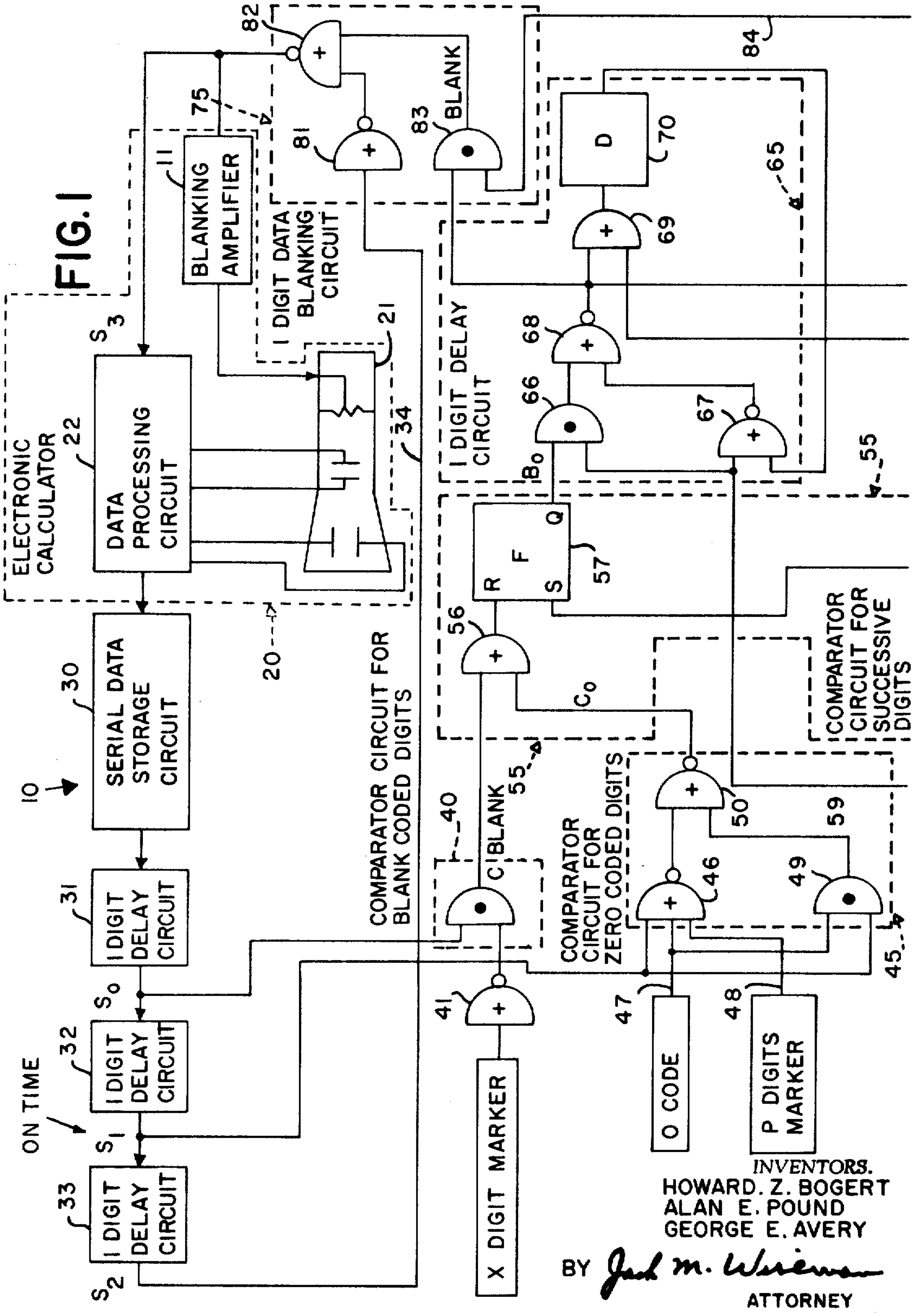

Other and further objects and advantages of the present invention will be apparent to one skilled in the art from the following description taken in conjunction with the accompanying drawings, in which:

FIGS. 1 and 1–*a*, with FIG. 1–*a* below FIG. 1, are a circuit diagram of the zero suppression circuit of the present invention illustrated with data processing circuits and a display device of an electronic calculator.

Figure 2:
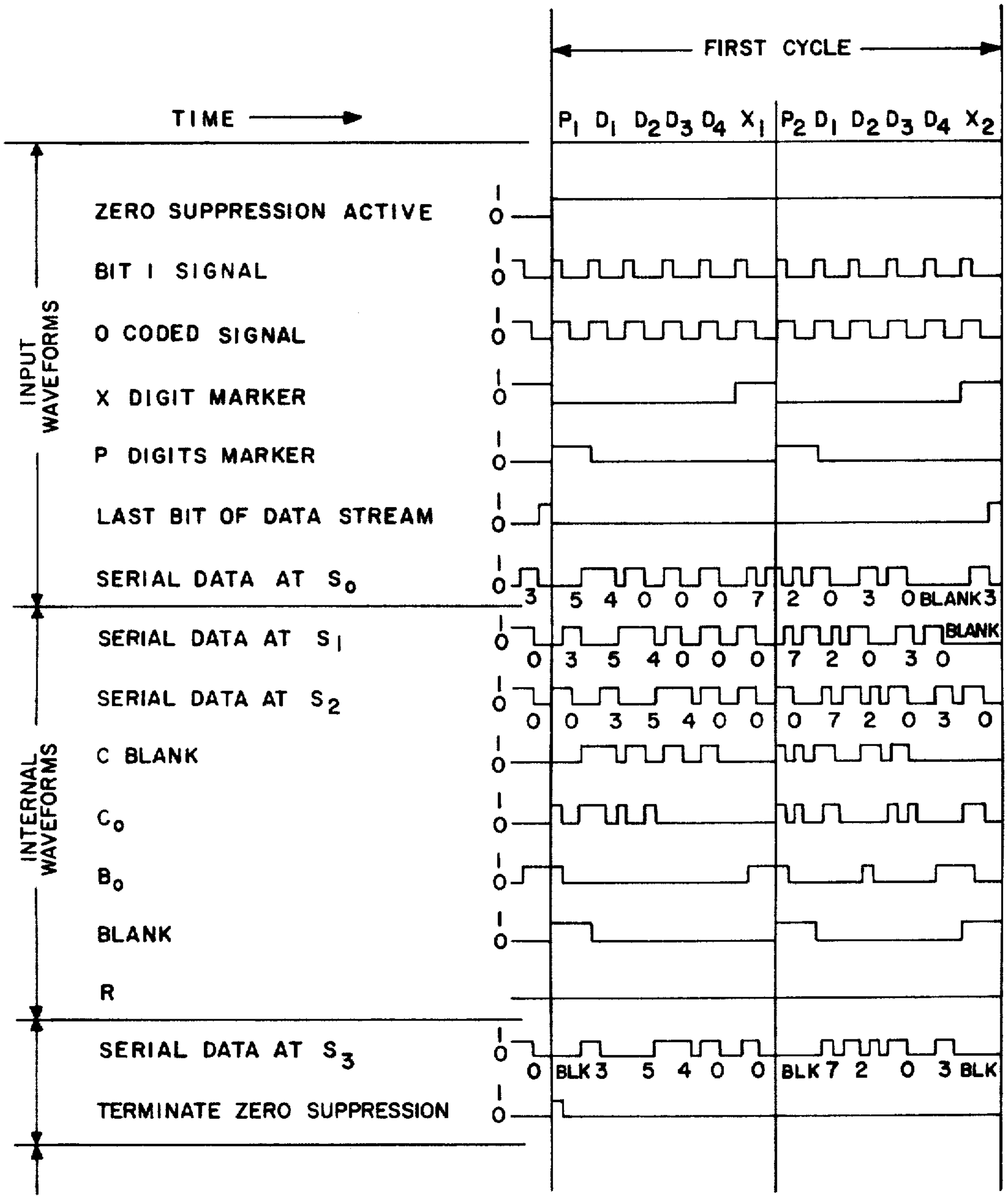

FIGS. 2, 2–*a* and 2–*b*, with FIG. 2–*a* to the right of FIG. 2 and FIG. 2–*b* to the right of FIG. 2–*a*, are a graphical illustration of the signals employed in or produced by the operation of the zero suppression circuit in a predetermined series of data words.

Figure 3:
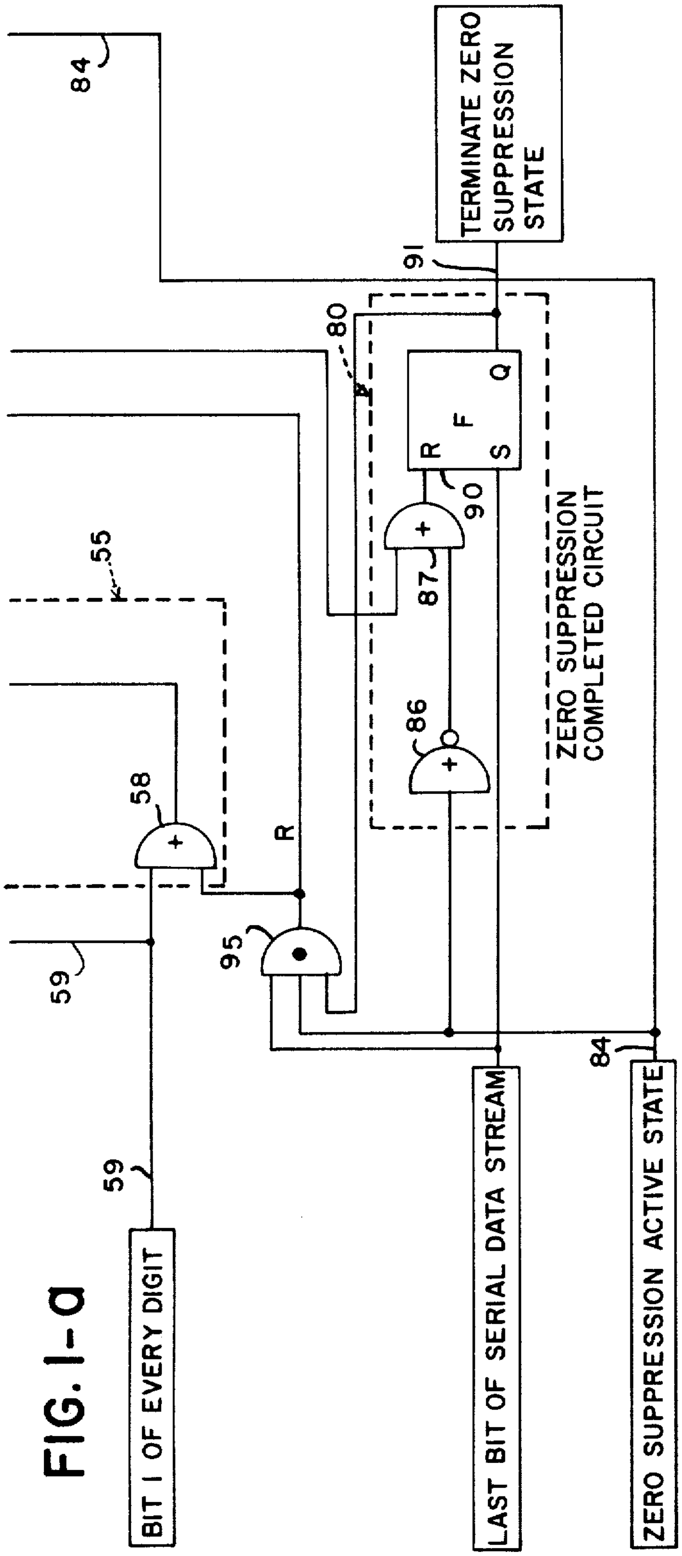
Figure 3:
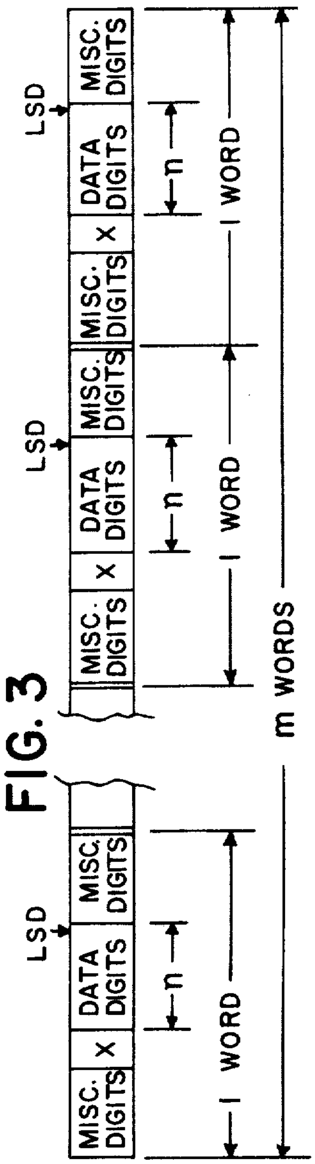

FIG. 3 is a diagrammatic illustration of a total data stream format.

In the zero suppression circuit 10 of the present invention, a completed data word, or data words, with numerical data therein is advanced through the zero suppression circuit 10 least significant digit first. As viewed on a display, the digit on the extreme right-hand side of a horizontally disposed integer or word is considered to be the least significant digit. Any digit to the left of the next adjacent digit is considered herein to be the more significant digit. Conversely, any digit to the right of the next adjacent digit in a horizontally disposed integer or word is considered herein to be the less significant digit. Each completed data word is followed by an extra digit, which is coded as a zero and is not part of the data word.

The zero suppression circuit 10 examines all digits in succession two adjacent digits at a time starting with the least significant digit. This occurs once during each circulation of the data word being examined. However, the suppression of insignificant zeros, if any, will be in the order of the more significant digit preceding the less significant digit. During the first examination in the testing of the completed data word, the extra digit is coded as a blank. During the second circulation cycle, the extra digit, which is now coded as a blank, and the most significant digit, are examined simultaneously. If the most significant digit is detected as a digit other than a zero, then there is no zero to be suppressed. Hence, a terminate suppression signal is generated and no further action takes place with respect to this particular data word.

On the other hand, should the most significant digit be a zero, it is then coded as a blank, and the completed data word is again recirculated through the zero suppression circuit 10 with the least significant digit first. The most significant digit, which is now coded as a blank, is followed by the adjacent successive digit, which is a less significant digit. As the serial data word is advanced through the zero suppression circuit 10 least significant digit first, the most significant digit is examined with the less significant adjacent digit. With the most significant digit coded as a blank and with the adjacent less significant digit coded as a zero simultaneously, a signal is generated which codes the less significant digit as a blank after a delay in time of one digit. If the less significant digit is a non-zero digit, a terminate suppression signal is generated.

Thus, the criterion for the zero suppression is a more significant blank code and an adjacent less significant zero code. If the blank code is adjacent to a less significant non-zero code in succession, then zero suppression is terminated. Should the examination for non-significant zeros continue, the data word is recirculated with the more significant digit coded as a blank and adjacent to the next succeeding digit, which is the less significant digit. As the serial data word is again recirculated through the zero suppression circuit 10, it examines all digits in succession two adjacent digits at a time during each recirculation of the data word. The more significant digit is examined to determine whether it is coded as a blank and the less significant digit is examined to determine whether it is coded as a zero digit. Should both conditions exist simultaneously, a blank signal is generated which codes the less significant digit as a blank after a delay in time of one digit.

The data word is continuously recirculated through the zero suppression circuit 10 and the procedure is repeated for each recirculation of the data word until a non-zero digit is detected adjacent to a more significant blank or when the end of the word is reached. Thus, if the data word is 00245, the sequence is as follows with "B" denoting a blank code:

| Word time: | Data word |
|---|---|
| Before start | 000245 |
| 1 | B0245 |
| 2 | BB0245 |
| 3 | BBB245 |
| 4 | [1]BBB245 |

[1] Generate Terminate Suppression Signal.

If the data stream consists of more than one data word the terminate suppression signal will not be generated until all data words have had all their insignificant zeros suppressed.

Illustrated in FIGS. 1 and 1–*a* is the zero suppression circuit 10 of the present invention for an electronic calculator 20 that serves to blank out serially in a horizontal scanning line insignificant ciphers to the left of the most significant non-zero digit in a data word or a series of data words, to prevent the display of the insignificant ciphers on a cathode ray tube 21 or other display device of the electronic calculator 20.

The electronic calculator 20 may be a conventional and well-known electronic calculator which includes conventional data processing cricuits or digital computer circuits 22. The data processing circuits 22 are connected to the horizontal and vertical deflecting plates of the cathode ray tube 21 to form an integer or data word comprising a plurality of decimal digits along a horizontal path on the cathode ray tube 21. The data processing circuits 22 are continuously producing decimal digits under the control of an operator. However, the integer or data word is not produced on the cathode ray tube until the completion of the zero suppression action.

The zero suppression circuit 10 of the present invention recognizes the blanking code and through its connection with the control grid of the cathode ray tube 21 selectively blanks out through a blanking amplifier 11 the insignificant ciphers to the left of the most significant non-zero digit in the integers or data words along the horizontal scanning path. While the preferred embodiment of the present invention makes reference to a cathode ray tube, it is apparent that any suitable calculator display device may also be employed.

As shown in FIG. 1, the zero suppression circuit 10 comprises a serial data storage circuit 30, which may be a well-known clock synchronous, binary coded, memory circuit, connected to the output of the data processing circuits 22.

The memory device 30 may be of the type described in detail in the pending patent application by Robert H. Norman el al., Ser. No. 385,444, filed on July 27, 1964, for Memory Device. The assignee of the present application is also the assignee of the aforesaid application filed by Robert H. Norman et al.

Although the display of the integer or word on the cathode ray tube 21 is in decimal digits, the output of the data processing circuits 22 fed to the serial data storage circuit 30 is in the form of binary coded decimal digits. More specifically, each decimal digit number is represented by four binary bits. In the exemplary embodiment, the digits are in the form of the excess three binary code. Thus, four consecutive binary bits advance least significant bit first through the serial data storage circuit 30 to represent one decimal digit and each integer or data word along the horizontal scanning line of the cathode ray tube 21 is a plurality of decimal digits.

Accordingly, advancing continuously through the serial data storage circuit 30 in clock synchronism are binary coded signals. In the exemplary embodiment, there are six words with each word containing twenty data digits, an extra digit and three additional non-data digits. Hence, the data processing circuits 22 are continuously producing signals representing binary coded words and the serial data storage circuit 30 advances continuously and successively signals representing binary coded words.

Connected to the output of the serial data storage circuit 30 are serially connected 1 digit delay circuits 31–33. The 1 digit delay circuits are well-known. The assignee of the present application is also the assignee of the aforesaid application filed by Howard Z. Bogert.

The first binary coded digit signal representing the first decimal digit is transmitted from the serial data storage circuit 30 to the 1 digit delay circuit 31. One digit later, the second binary coded digit signal representing the second decimal digit is transmitted from the serial data storage circuit 30 to the 1 digit delay circuit 31. Simultaneously therewith, the signal representing the first binary coded digit advances from the 1 digit delay circuit 31 to the 1 digit delay circuit 32. At this time, the binary coded digit signal advancing to the 1 digit delay circuit 32 represents the least significant digit and the binary coded digit signal transmitted to the 1 digit delay circuit 31 represents a more significant digit. The serial data storage circuit 30 transmits the less significant digit first followed by an adjacent successive more significant digit.

When the serial data storage circuit 30 transmits the bniary coded digit signal representing the third decimal digit to the 1 digit delay circuit 31, the second binary coded digit signal advances simultaneously to the 1 digit delay circuit 32 and the first binary coded digit signal advances simultaneously to the 1 digit delay circuit 33. At the time the serial data storage circuit 30 feeds the fourth binary coded digit signal representing the fourth decimal digit to the 1 digit delay circuits 31, the third binary coded digit signal advances simultaneously to the 1 digit delay circuit 32, the second binary coded digit signal advances simultaneously to the 1 digit delay circuit 33 and the first binary coded digit signal is transmitted simultaneously from the 1 digit delay circuit 33 over a conductor 34.

From the foregoing, it is to be observed that binary coded digit signals are transmitted less significant digit first successively and sequentially from the serial data storage circuit 30 and advance serially and successively through the 1 digit delay circuits 31, 32 and 33 in the consecutive order named.

Connected to the output of the 1 digit delay circuit 31 is a comparator 40 for testing for a blank coded digit signal. The comparator 40 comprises a conventional and-gate logic circuit, which has an input thereof connected to the output of the 1 digit delay circuit 31. The and-gate logic circuit of the comparator 40 checks a binary coded digit signal at the terminal $S_0$ for an existing blank code. Should the comparator 40 detect a blank code signal from the output of the 1 digit delay circuit 31, it produces in its output a logic zero signal for the entire digit time. On the other hand, should the and-gate logic circuit not detect a blank coded signal, its output produces a logic 1 signal for at least 1 bit time during the digit time.

As previously described, the last digit of any word or integer, which is the last digit examined for each data word transmitted by the serial data storage circuit 30, which is considered herein as the extra digit, is coded as a blank. It is not part of the data word. Toward this end, a series of timing pulses herein referred to as X digit marker (FIGS. 1 and 2) are transmitted to a conventional inverter circuit 41 to indicate the end of a word or integer. The X digit marker is in the logic 1 state only during the time when an X digit is being advanced from 1 digit delay circuit 32 to 1 digit delay circuit 33. In turn, the output of the inverter circuit 41 is connected to an input of the comparator 40 to form a blank coded signal for the extra digit so that the output of the comparator 40 for the extra digit or the end of a word is a logic 0 signal for the entire digit. Thus, the last digit of any word transmitted to the 1 digit delay circuit 31 by the serial data storage circuit 30 is treated as a blank by the comparator 40 in response to the X digit marker received through the inverter circuit 41.

From the foregoing, it is to be observed that the extra digit of any word or integer will be treated as a blank and cannot be used as part of the data word. The preceding or less significant binary coded digits may or may not be coded as blanks. The comparator 40 serves to detect each binary coded digit transmitted thereto by the 1 digit delay circuit 30 to determine whether it is coded as a blank.

Connected to the output of the 1 digit delay circuit 32 is a comparator circuit 45 which serves to compare the signal fed thereto with a zero coded signal to determine whether the binary coded digit transmitted thereto is a zero digit. The binary coded digit signal transmitted by the 1 digit delay circuit 32 is delayed one digit in time with respect to the binary coded digit signal transmitted by the digit delay circuit 31. Hence, the binary coded digit signal transmitted by the digit delay circuit 31 is more significant than the binary coded digit signal transmitted by the 1 digit delay circuit 32. However, the binary coded signal transmitted by the 1 digit delay circuit 32 to be examined for a zero coded signal is on time, while the more significant binary coded signal transmitted by the 1 digit delay circuit 31 to be examined for a blank coded signal is one digit time earlier.

The comparator circuit 45 comprises a conventional nor-gate logic circuit 46, which has an input thereof connected to the output of the 1 digit delay circuit 32 at the terminal $S_1$. Another input of the nor-gate logic circuit 46 is connected to a conductor 47 over which a zero coded signal is transmitted (FIGS. 1 and 2). In addition thereto, P digits marking pulses (FIGS. 1 and 2) are transmitted to an input of the nor-gate logic circuit 46 over a conductor 48. P digit markers are in a logic 1 state only when P digits are being advanced from a digit delay circuit 32 to 1 digit circuit 33. The P digits are the miscellaneous digits in a word other than the X digit marker, which represents the last digit of a word.

The conductor 47 and the output of the 1 digit delay circuit 32 are also connected to a conventional and-gate logic circuit 49 of the zero comparator circuit 45. In turn, the output of the and-gate logic circuit 49 and the nor-gate logic circuit 46 are connected to a conventional nor-gate logic circuit 50. Through this arrangement, the comparator circuit 45 checks for a zero coded binary digit signal at the output of the 1 digit delay circuit 32. If a zero coded binary digit signal is detected, the comparator circuit 45 produces a logic zero signal in its output for the entire digit time. In the event a non-zero coded binary digit signal is detected, the comparator circuit 45 produces a logic 1 signal in its output for at least one bit time during the digit time.

The output signals of the zero comparator circuit 45 and the blank comparator 40 are fed simultaneously to a comparator circuit 55. As the serial data word advances continuously through the serial data storage circuit 30, a less significant digit precedes a more significant digit. The comparator circuit 55 examines simultaneously two digits in succession during each recirculation of the completed data word. In so doing, the comparator circuit 55 determines whether the more significant digit is coded for a blank and whether the less significant digit is coded for a zero. Should both conditions exist simultaneously, then the signal transmitted by the comparator circuit 55 is a logic 1 signal.

The comparator circuit 55 comprises a conventional or-gate logic circuit 56 which has one input thereof connected to the output of the blank comparator circuit 40 and has another input thereof connected to the output of the zero comparator circuit 45. Connected to the output of the or-gate logic circuit 56 is the reset input of a conventional set-reset flip-flop circuit 57 in which the reset input overrides the set input. The set input of the flip-flop circuit 57 is connected to the output of a conventional or-gate logic circuit 58. In turn, an input of the or-gate logic circuit 58 is connected to a conductor 59 over which are transmitted pulses representing bit 1 of every binary coded digit signal (FIGS. 1-*a* and 2).

The flip-flop circuit 57 at the beginning of each digit time is set to a logic 1 through the pulses transmitted over the conductor 54 and the or-gate logic circuit 58. The output of the flip-flop circuit 57 remains at a logic 1 in the event the output of the blank comparator circuit 40 is a logic zero and the output of the zero comparator circuit 45 is a logic zero. Accordingly, the output of the comparator circuit 55 is a logic 1 when the more significant digit is a blank and the less significant digit is a zero simultaneously.

The output of the comparator circuit 55 is fed to the input of a 1 digit delay circuit 65. The output of the 1 digit delay circuit 65 is timed to coincide with the less significant digit. Hence, the output of the 1 digit delay circuit 65 produces a one digit wide blanking or suppressing signal which is timed with the less significant digit. Therefore, should two digits in succession be examined with the less significant digit being coded a zero digit and the more significant digit being coded a blank, the less significant digit will be changed to a blank code as it circulates or advances through the zero suppression circuit 10.

Should the comparator circuit 55 not detect simultaneously a blank code for the more significant digit and a zero code for the less significant digit, then there is no zero to be suppressed for the less significant digit, and a logic signal will be transmitted from the 1 digit delay circuit 65 to initiate a terminate suppression signal during the succeeding word cycle.

The 1 digit delay circuit 65 comprises a conventional and-gate logic circuit 66, which has an input thereof connected to the output of the flip-flop circuit 57 of the comparator circuit 55 and another input thereof connected to the conductor 59 over which is transmitted bit 1 of every digit signal (FIGS. 1-*a* and 2). The conductor 59 is also connected to an input of a conventional nor-gate logic circuit 67. Connected to the output of the and-gate logic circuit 66 and the nor-gate logic circuit 67 is a conventional nor-gate logic circuit 68. A conventional or-gate logic circuit 69 has an input thereof connected to the output of nor-gate logic circuit 68. The output of the or-gate logic circuit 69 is connected to a conventional bit delay circuit 70. It is the output of the 1 bit delay circuit 70 that is connected to another input of the nor-gate logic circuit 67. It is to be observed that the output of the 1 digit delay circuit 65 is obtained at the output of the nor-gate logic circuit 68.

The output of the nor-gate logic circuit 68 is connected to a 1 digit data blanking circuit 75. The set input of the flip-flop circuit 57 for the comparator circuit 55 always goes to a logic 1 at the beginning of each digit. This is accomplished through the pulses transmitted over the conductor 59 to a signal bit 1 of every digit. The same signal prepares the 1 digit delay circuit 65 for operation at the end of each digit or the beginning of zero suppression examination. The reset input of the flip-flop circuit 57 will be activated if either the output of the blank comparator circuit 40 or the zero comparator circuit 45 is a logic 1 signal at any time during the digit. If the reset input of the flip-flop circuit 57 is not activated, the output of the comparator circuit 55 remains a logic 1 as long as the output signal of the comparator circuit 40 is a logic zero signal and the output of the comparator circuit 45 is a logic zero signal. This indicates the more significant digit is a blank and the less significant digit is a zero.

The output of the comparator circuit 55 under the just-described conditions is a 1 digit wide blank signal, which is delayed approximately 1 digit in time by the 1 digit delay circuit 65. As a consequence thereof, the zero coded signal examined by the comparator circuit 45 at the terminal $S_1$ arrives at the 1 digit data blanking circuit 75 at the same time as the blanking signal is transmitted to the 1 digit data blanking circuit 75. It is recalled that the zero coded signal after advancing from the 1 digit delay circuit 32 advances through the 1 digit circuit 33, which feeds the zero coded signal to the 1 digit data blanking circuit 75. In a like manner, the logic 1 signal transmitted by the comparator circuit 55 advances through the 1 digit delay circuit 65, which then feeds the blanking signal to the 1 digit data blanking circuit 75. Hence, the zero coded signal advancing from the serial data storage circuit 30 arrives at the 1 digit data blanking circuit 75 at the same time as does the blanking signal produced by the zero-blank comparator circuit 55.

The output of the 1 digit delay circuit 65 is fed to a 1 digit data blanking circuit 75, the output of the 1 digit delay circuit 33 is fed to the 1 digit data blanker 75, and a zero suppression active signal is fed to the 1 digit data blanking circuit 75 over a conductor 84. The digit data blanking circuit 75 serves to transmit a blank coded signal at the terminal $S_3$ to the data processing circuits 22 in timed sequence with the advancement of the insignificant digit to the serial data storage circuit. A blanking signal will be generated by the blanking amplifier 11 on the control grid during the digit time the insignificant digit would appear on the cathode ray tube 21 in response to the recognition of the blank coded digit produced by the 1 digit data blanking circuit 75.

Should the output of the 1 digit delay circuit 32 represent a significant non-zero coded signal, then the output of the comparator circuit 55 will be driven to the logic zero state. As a consequence thereof, the 1 digit data blanking circuit 75 does not produce a blank coded signal for the transmission to the data processing circuits 22, but instead a logic zero signal for terminating the zero suppression is transmitted from the output of the 1 digit delay circuit 65 to a zero suppression complete circuit 80.

The 1 digit data blanking circuit 75 comprises a conventional inverter circuit 81 which has its input connected to the 1 digit delay circuit 33 and has its output connected to a conventional nor-gate logic circuit 82. In the 1 digit data blanking circuit 75 is also a conventional and-gate logic circuit 83 which has an input connected to the 1 digit delay circuit 68 and an input connected to the conductor 84 over which is transmitted the zero suppression active state signal (FIGS. 1-*a* and 2). The output of the and-gate logic circuit 83 is connected to another input of the nor-gate logic circuit 82. In turn, the output of the nor-gate logic circuit 82 is connected to the data processing circuits 22 and the control grid of the cathode ray tube 21 through the blanking amplifier 11.

At the beginning of a word or integer, a zero suppression active state pulse signal transmitted over the conductor 84 conditions the 1 digit data blanking circuit 75 for operation. The zero suppression completed circuit 80 is connected to the conductor 84 to receive therefrom the zero suppression active state signal. The zero suppression active state signal prepares the zero suppression completed circuit 80 at the beginning of each zero suppression operation. Also connected to the input of the zero suppression completed circuit 80 is the output of the 1 digit delay circuit 65. Should the signal from the output of the 1 digit delay circuit 65 be a logic signal to represent a significant non-zero digit signal, then the zero suppression completed circuit 80 emits a signal to terminate zero suppression state.

The zero suppression completed circuit 80 comprises a conventional inverter circuit 86, which has its input connected to the conductor 84 over which the zero suppression active state pulse signal is transmitted. One input circuit of a conventional or-gate logic circuit 87 is connected to the output of the inverter circuit 86 and another input thereof is connected to the output of the 1 digit delay circuit 65. In turn, the output of the or-gate logic circuit 87 is connected to the reset input of a conventional set-reset flip-flop circuit 90. Connected to the set input of the flip-flop circuit 90 is the conductor 85 over which the last bit of serial data stream pulse signal is transmitted. The output of the flip-flop circuit 90 is connected to a conductor 91 over which is transmitted a signal to terminate zero suppression state for zero suppression circuit 10.

The flip-flop circuit 90 is always set to a logic 0 state at the beginning of the zero suppression operation by the zero suppression active state signal transmitted over the conductor 84 through the inverter 86 and through the or-gate logic circuit 87. The flip-flop circuit 90 is then set to the logic 1 state at the end of the first word cycle by the last bit of the serial data stream signal transmitted over the conductor 85. When the logic 1 signal is produced in the output of the 1 digit data delay circuit 65, the flip-flop circuit 90 is reset to a logic zero state and does not produce a terminate zero suppression state signal. On the other hand, should the output of the 1 digit delay circuit 65 be a logic zero signal to indicate all the zeros have been suppressed, the flip-flop circuit 90 is not reset and remains in the logic 1 state. As a consequence thereof, a terminate zero suppression signal is transmitted over the conductor 91. Should the flip-flop circuit 90 remain in the logic 1 state when the last bit of serial data stream pulse signal is transmitted over the conductor 85, the operation of the zero suppressor circuit 10 is ended and the zero suppression active state signal will go to the logic zero state.

For terminating the operation of the zero suppression circuit 10, a conventional and-gate logic circuit 95 has one input thereof connected to the conductor 85 over which is transmitted the last bit of serial data stream signal. Another input thereof is connected to a conductor 84 over which is transmitted the zero suppression active state signal. The last input of the and-gate logic circuit 95 is connected to the output of the flip-flop circuit 90. The output of the and-gate logic circuit is connected to an input of the or-gate logic circuit 58 of the blank-zero comparator circuit 55 and to an input of the 1 digit delay circuit 65.

In case all digits in the word, or words, are zeros, the zero suppression operation is terminated by using the P digits marker on conductor 48 to force the zero comparator circuit 45 output to the logic 1 state during the P digit time. This prevents the comparator circuit 55 output from changing to the logic 1 state, which in turn prevents the 1 digit delay circuit 65 output from generating a signal to reset the flip-flop circuit 90. This action, in turn, causes the terminate zero suppression state signal to be produced over the conductor 91.

FIG. 3 illustrates a total data stream format wherein

*m* represents the number of words in the serial data stream circulating through the serial data storage circuit 30 least significant digit first;

*n* represents the number of data digits per word;

*x* represents the extra digit or the digit adjacent to the most significant digit of each data word and is coded as a zero;

*p* represents the number of miscellaneous P digits per word in addition to the extra digit;

LSD represents the least significant digit of each data word.

The total number of digits per word is:

$$n+p+1 \text{ where 1 represents digit X}$$

The total number of digits in the serial data stream is:

$$m(n+p+1)$$

Each digit in the exemplary embodiment is assumed to be 4 bits long and will be in the excess 3 binary coded decimal format. A blank coded digit is defined herein as all bits of the digit equal to a logic zero.

In the operation of the zero suppression circuit 10, let it be assumed by way of example or illustration that the completed words or integers recirculated by the data processing circuits 22 are 0045 and 0302. Graphically, the operation is described as follows:

| Stream Time | $X_2$ | Word | $P_2$ | $X_1$ | Word 1 | $P_1$ |
|---|---|---|---|---|---|---|
| Before Suppression | 0 | 0302 | 7 | 0 | 0045 | 3 |
| Cycle 1 | B | 0302 | 7 | B | 0045 | 3 |
| Cycle 2 | B | B302 | 7 | B | B045 | 3 |
| Cycle 3 | B | B302 | 7 | B | BB45 | 3 |
| Cycle 4 | B | B302 | 7 | B | BB45 | *3 |
| After Suppression | B | B302 | 7 | B | BB45 | 3 |

*Terminate zero suppression.

The serial data storage circuit transmits the least significant digit first and under the present example the advancement of binary digits therethrough appear in the following order 354000720300. However, the examination for insignificant ciphers to the left of a significant non-zero digit is in the reverse order. During the first circulation of the data words, the extra digit $X_1$ is zero coded and advances through the 1 digit delay circuits 31 and 32. At the terminal $S_1$, the zero coded extra digit $X_1$ is transmitted to the comparator circuit 45 where it is detected as a zero coded digit. At the same time the successive P digit is transmitted to the comparator circuit 40 where it is treated as a blank coded digit by means of the transmission of the X digit marker signal through the inverter circuit 41. In a like manner, the extra digit $X_2$ during the first circulation of the data words is zero coded and advances through the 1 digit delay circuits 31 and 32. At the terminal $S_1$, the zero coded extra digit $X_2$ is transmitted to the comparator circuit 45 where it is detected as a zero coded digit. At the same time, the successive P digit is transmitted to the comparator circuit 40 where it is treated as a blank coded digit by means of the transmission of the X digit marker signal through the inverter circuit 41. As the extra digits $X_1$ and $X_2$ advance through the 1 digit delay circuits 32 and 33 and then through the 1 digit data blanking circuit 75 to return to the data processing circuits 22 for recirculation, they will be blank coded as they travel through the blanking circuit 75, data processing circuits 22 and the serial data storage circuit 30.

During the second recirculation of the data words, the binary coded digit 0 will advance through the 1 digit delay circuit 32 while the blank coded extra digit $X_1$ advances through the 1 digit delay circuit 31. Thereupon, the comparator circuit 40 connected to the terminal $S_0$ examines the blank coded digit and simultaneously the comparator circuit 45 examines a zero coded digit. The output of the comparator circuit 40 is a logic zero and the output of the comparator circuit 45 is a logic zero for the entire digit time.

Concurrently, the output signals of the comparator circuits 40 and 45 are fed to the comparator circuit 55. The flip-flop circuit 57 of the comparator circuit 55 is set at the beginning of each digit for a logic 1 output through the bit 1 of every digit signal transmitted over the conductor 59 and the or-gate logic circuit 58. Since the comparator circuit 40 detected a blank extra digit $X_1$ and the comparator circuit 45 detected a zero most significant digit for data word 1, the flip-flop circuit 57 maintains the logic 1 signal in its output.

The most significant digit of data word 1 advances through the 1 digit delay circuit 33 and through the 1 digit data blanking circuit 75. In timed sequence, the logic 1 output signal emanating from the comparator circuit 55 advances through the 1 digit delay circuit 65 and through the 1 digit data blanking circuit 75, where the zero code is changed to the blank code. Now, the most significant digit of word 1 is blank coded as it advances for recirculation through the data processing circuits 22 and the serial data storage circuit 30.

During the same recirculation of the data words, the most significant digit zero of word 2 advances through the 1 digit delay circuit 32 and the blank coded extra digit $X_2$ advances through the 1 digit delay circuit 31. Thereupon, the comparator circuit 40 connected to the terminal $S_0$ examines the blank coded signal and simultaneously the comparator circuit 45 examines a zero coded digit.

Concurrently, the output signals of the comparator circuits 40 and 45 are fed to the comparator circuit 55. The flip-flop circuit 57 of the comparator circuit 55 is at the beginning of each digit for a logic 1 output through the 1 bit 1 of every digit signal transmitted over the conductor 59 and the or-gate logic circuit 58. Since the comparator circuit 40 detected a blank extra digit $X_2$ and the comparator circuit 45 detected a zero most significant digit for data word 2, the flip-flop circuit 57 maintains the logic 1 signal in its output.

The most significant digit of data word 2 advances through the 1 digit delay circuit 33 and through the 1 digit data blanking circuit 75. In timed sequence, the logic 1 output signal emanating from the comparator circuit 55 advances through the 1 digit delay circuit 65 and through the 1 digit blanking circuit 75 where the zero code is changed to the blank code. The most significant digit of word 2 is blank coded as it advances for recirculation through the data processing circuits 22 and the serial data storage circuit 30.

During the first cycle while the zero suppression circuit 10 examined each two adjacent digits of words 1 and 2, such as 3–5, 5–4, 4–0, 0–0, 0–0 for word 1 and 7–2, 2–0, 0–3, 3–0, 0–0 for word 2, there was not present simultaneously a more significant blank code followed by a less significant zero code. However, the X digit marker pulse causes the output of the comparator circuit 40 to go to a logic zero during the time a P digit is read out of the 1 digit delay circuit 31. Hence, the logic output of the flip-flop circuit 57 of the comparator circuit 55 went to a logic 1 and the blank coding operation of the 1 digit data blanking circuit 75 was activated. This blank-coded the extra digits $X_1$ and $X_2$. The zero suppression completed circuit 80 did not produce a terminate zero suppression signal, since it was reset by the output of the 1 digit data blanking circuit 75 going to a logic 1.

During the succeeding cycle, the most significant digit of data word 1, the $X_1$ extra digit, the most significant digit of data word 2 and the $X_2$ extra digit are blank coded while the data words are recirculated through the data processing circuits 22 and the serial data storage circuit 30.

When the less significant digit 0 of word 1 advances through the 1 digit delay circuit 32 to terminal $S_1$ and the blank coded most significant digit of word 1 advances through the 1 digit delay circuit 31 to terminal $S_0$, the comparator circuit 45 detects a zero code and the comparator circuit 40 detects a blank code. In the manner previously described, the 1 digit data blanking circuit 75 is timed sequence with the advancement of the less significant zero to the data processing circuit 22 causes the less significant digit to be blank coded. As the data words 1 and 2 are again recirculated through the serial data storage circuit, the extra digits $X_1$ and $X_2$, the most significant digits of the data words 1 and 2, and the just mentioned less significant zero digit are blank coded.

The zero suppression circuit 10 continues to examine the two adjacent successive digits, such as 3–5, 5–4, 4–B, B–B, B–B for data word 1 and 7–2, 2–0, 0–3, 3–B and B–B for data word 2. Since the comparator circuits 40 and 45 did not detect simultaneously a more significant blank code and an adjacent less significant zero code, the logic output of the flip-flop circuit 57 of the comparator circuit 55 went to zero, and the blanking code operation of the 1 digit data blanking circuit 75 was not activated.

At the time the digits 3–5 were re-examined, the zero suppression completed circuit 80 was conditioned for operation by the last bit of the serial data stream signal transmitted thereto over the conductor 85. Thereupon, the output of the flip-flop circuit 90 of the zero suppression completed logic circuit 80 goes to the logic 1 state and will not be reset by any blanking signal from the 1 digit data blanking circuit 75. Since the flip-flop circuit 90 is not reset at the time the succeeding last bit of serial data stream signal is transmitted thereto, a terminate zero suppression signal is transmitted from the flip-flop circuit 90 of the zero suppression completed circuit 80 to terminate the zero suppression operation. Thus, appearing on the cathode ray tube 21 are the data words 302 and 45.

It is to be understood that modifications and variations of the embodiment of the invention disclosed herein may be resorted to without departing from the spirit of the invention and the scope of the appended claims.

Having thus described our invention, what we claim as new and desire to protect by Letters Patent is:

1. A character suppression circuit for a calculator comprising means for advancing a data word with a coded signal representing a more significant character adjacent to a coded signal representing a less significant character, means for examining the coded signal representing the more significant character, means for examining the coded signal representing the less significant character adjacent to the more significant character, and means responsive to the examination of the coded signal representing the more significant character and the coded signal representing the less significant character adjacent to the more significant character for blanking the coded signal representing the less significant character.

2. A character suppression circuit as claimed in claim 1 wherein said less significant character is coded for a zero digit signal and said more significant character is coded for a blank digit signal.

3. A character suppression circuit as claimed in claim 1 wherein said means for advancing a data word advances the characters thereof in succession with the coded signal representing the less significant character preceding the coded signal representing the more significant character.

4. A character suppression circuit as claimed in claim 3 wherein said means for examining said characters examine said characters in a sequence for blanking the coded signal representing the more significant character before the blanking of the coded signal representing the less significant character.

5. A character suppression circuit as claimed in claim 1 wherein said means for blanking the coded signal representing the less significant character forms a blank coded signal.

6. A character suppression circuit as claimed in claim 1 wherein said means for blanking the coded signal representing the less significant character suppresses the coded signal representing the less significant character.

7. A zero suppression circuit comprising a data word advancing circuit for advancing signals representing a data word least significant digit first and advancing the signals representing respective digits thereof in succession, blank examining means for examining a signal representing a more significant digit of said data word for determining whether the signal representing the more significant digit is blank coded, zero examining means for examining a signal representing a less significant digit of said data word for determining whether the adjacent signal representing the less significant digit is zero coded, a comparator circuit responsive to said zero examining means examining a zero coded signal and said blank examining means examining simultaneously a blank coded signal adjacent to said zero coded signal for producing a predetermined output signal, and means responsive to said predetermined output signal for transmitting said signals representing the data word to said data word advancing circuit to advance the signals representing said data word for recirculation through said data word advancing circuit and for blank coding the signal representing the less significant zero digit.

8. A zero suppression circuit as claimed in claim 7 and comprising a plurality of serially connected digit delay circuits for receiving sequentially from said data word advancing circuit signals representing respective digits of said data word, said zero examining means being connected to one of said digit delay circuits for examining the less significant digit for a zero coded signal, said blank examining means being connected to another of said digit delay circuits for examining the more significant digit for a blank coded signal.

9. A zero suppression circuit as claimed in claim 8 and comprising a delay circuit connected to the output of said comparator circuit for delaying the operation of said means for blank coding the signal representing said less significant digit so said signal representing said less significant digit is blank coded in timed relation with the circulation of the less significant digit in said data word.

10. A zero suppression circuit as claimed in claim 7 and comprising a zero suppression complete circuit connected to said comparator circuit for emitting a terminate zero suppression signal in response to the suppression of all signals representing insignificant zero digits to the left of a significant non-zero digit.

11. A character suppression circuit as claimed in claim 1 wherein said means for advancing a data word advances a signal representing an extra digit to follow said signals representing said data word.

12. A character suppression circuit as claimed in claim 2 wherein said means for advancing signals representing a data word advances a signal representing an extra digit coded as a zero digit signal to follow said signals representing said data word.

13. A zero suppression circuit as claimed in claim 7 wherein said data word advancing circuit advances a signal representing an extra digit coded as a zero digit signal to follow said signals representing said data word.

14. A zero suppression circuit as claimed in claim 12 wherein said means for blank coding the signal representing the less significant zero digit blank codes the signal representing the extra digit.

15. A zero suppression circuit as claimed in claim 7 wherein said blank examining means and said zero examining means examines signals representing all digits of said data word taken two digits at a time in succession.

References Cited

UNITED STATES PATENTS

| | | | |
|---|---|---|---|
| 3,107,342 | 10/1963 | Estrems et al. | 340—172.5 |
| 3,121,860 | 2/1964 | Shaw | 340—172.5 |
| 3,219,982 | 11/1965 | Tucker | 340—172.5 |
| 3,248,705 | 4/1966 | Dammann et al. | 340—172.5 |

ROBERT C. BAILEY, *Primary Examiner.*

R. ZACHE, *Assistant Examiner.*